(12) United States Patent
Kono

(10) Patent No.: US 7,522,317 B2
(45) Date of Patent: Apr. 21, 2009

(54) IMAGE READING DEVICE

(75) Inventor: Takanobu Kono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1037 days.

(21) Appl. No.: 10/451,450

(22) PCT Filed: Dec. 20, 2001

(86) PCT No.: PCT/JP01/11219

§ 371 (c)(1),
(2), (4) Date: May 4, 2004

(65) Prior Publication Data

US 2004/0196504 A1 Oct. 7, 2004

(30) Foreign Application Priority Data

Dec. 20, 2000 (JP) ............................ 2000-386837

(51) Int. Cl.
  *H04N 1/04* (2006.01)
  *H04N 1/40* (2006.01)
  *H04N 1/38* (2006.01)
(52) U.S. Cl. .................. 358/474; 358/448; 358/463; 358/461
(58) Field of Classification Search .............. 358/474, 358/448, 463, 461, 473, 475, 482, 483, 505, 358/509, 513, 514, 497, 486; 250/208.1, 250/234, 235, 236; 382/274, 275
See application file for complete search history.

(56) References Cited

U.S. PATENT DOCUMENTS

| | | | |
|---|---|---|---|
| 4,677,306 A | 6/1987 | Yamano | |
| 5,051,842 A * | 9/1991 | Shimazaki | ................. 358/463 |
| 5,233,430 A | 8/1993 | Takamura et al. | |
| 5,289,000 A * | 2/1994 | Toyofuku | ................. 250/234 |
| 5,760,430 A | 6/1998 | Kato | |
| 6,014,470 A * | 1/2000 | Matsuda | ................. 382/275 |
| 6,249,362 B1 * | 6/2001 | Sato et al. | ................. 358/509 |
| 6,289,134 B1 * | 9/2001 | Kondo et al. | ................. 382/274 |
| 6,359,706 B1 * | 3/2002 | Arita et al. | ................. 358/486 |

(Continued)

FOREIGN PATENT DOCUMENTS

JP 60-176370 9/1985

(Continued)

OTHER PUBLICATIONS

Japanese Office Action issued on Feb. 2, 2006 (no translation).

(Continued)

*Primary Examiner*—Houshang Safaipour
(74) *Attorney, Agent, or Firm*—Edwards Angell Palmer & Dodge LLP; John J. Penny, Jr.

(57) ABSTRACT

Delay circuit parts are disposed between a signal converting part and buffers. Since the capacities of delay elements provided respectively for the wiring of output wiring parts are different, time lag is generated respectively in the output timings of digital output signals outputted from the signal converting part relative to control clock signals. The output timings of the digital output signals shift so that the simultaneous switching of the digital output signals is prevented. Accordingly, EMI noise can be reduced without requiring the use of a special interface standard or the addition of shield members.

9 Claims, 8 Drawing Sheets

U.S. PATENT DOCUMENTS

| | | | |
|---|---|---|---|
| 7,006,260 B2 * | 2/2006 | Sato et al. | 358/448 |
| 7,050,199 B2 * | 5/2006 | Fuse | 358/505 |
| 2002/0145764 A1 * | 10/2002 | Suzuki | 358/461 |

FOREIGN PATENT DOCUMENTS

| | | | |
|---|---|---|---|
| JP | 11-331484 | | 11/1988 |
| JP | 01-261021 | * | 10/1989 |
| JP | 1-261021 | | 10/1989 |
| JP | 3-222518 | | 10/1991 |
| JP | 04-004662 | | 1/1992 |
| JP | 4-180454 | | 6/1992 |
| JP | 4-236586 | | 8/1992 |
| JP | 5-20891 | | 1/1993 |
| JP | 5-216816 | | 8/1993 |
| JP | 5-326919 | | 12/1993 |
| JP | 6-292065 | | 10/1994 |
| JP | 9-191101 | | 7/1997 |
| JP | 9-312810 | | 12/1997 |
| JP | 10-322513 | | 12/1998 |
| JP | 10-327293 | | 12/1998 |
| JP | 11-127303 | | 5/1999 |
| JP | 11-259050 | | 9/1999 |
| JP | 11-288339 | | 10/1999 |
| JP | 2000-101934 | | 4/2000 |
| JP | 2000-125214 | | 4/2000 |
| JP | 2000-299772 | | 10/2000 |

OTHER PUBLICATIONS

International Search Report with English Translation (PCT/ISA/220) dated Apr. 16, 2002.

Japanese Office Action issued on Apr. 19, 2006 for corresponding Japanese patent application No. 2000-373003.

* cited by examiner

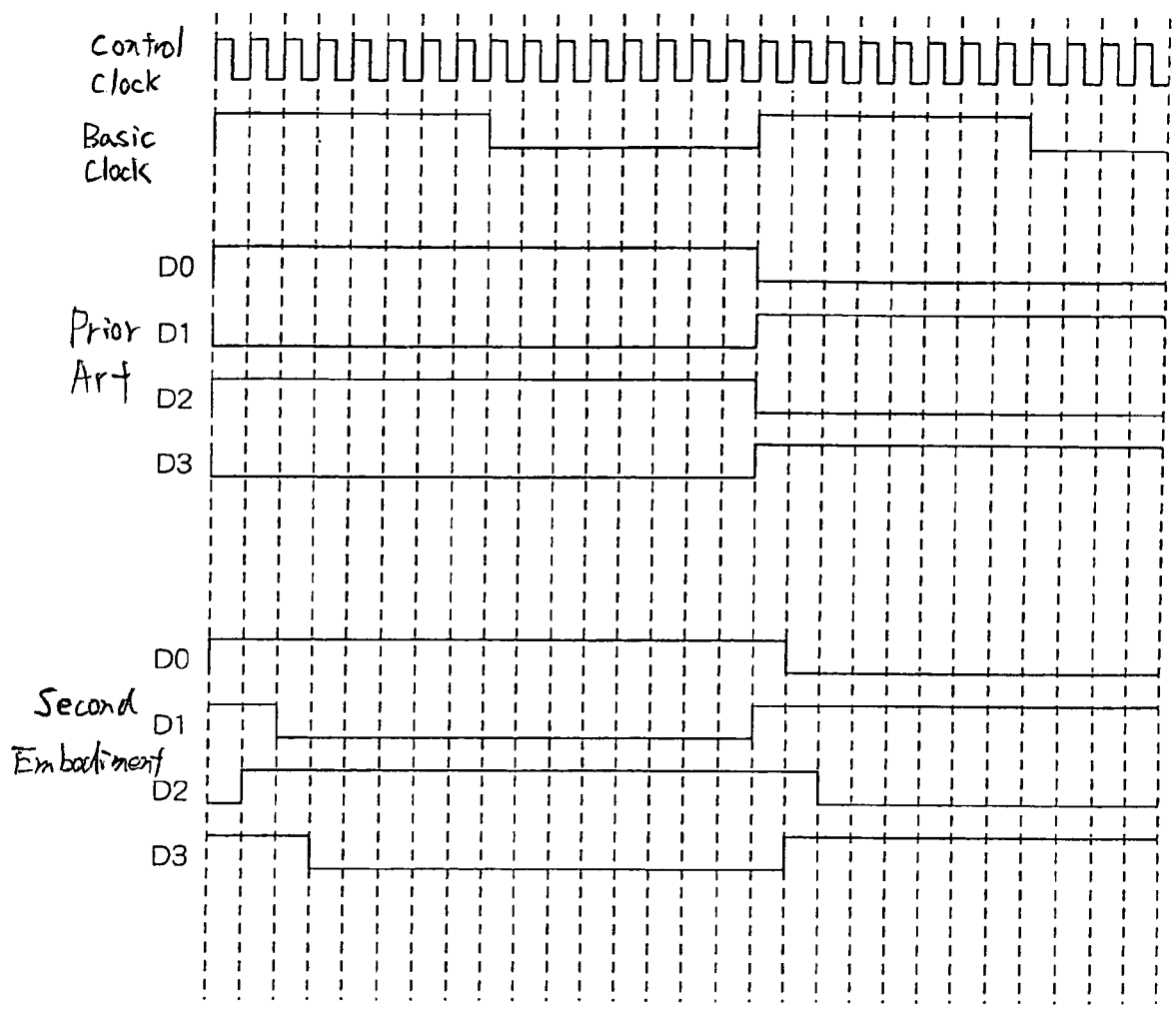

IMAGE READING DEVICE

TECHNICAL FIELD

The present invention relates to an image reading apparatus.

BACKGROUND ART

In not only an image reading apparatus, but also an electronic computer and peripheral devices thereof (refer to the electronic computer and the peripheral devices thereof to as a "computer or the like", hereinafter), the generation of noise due to the influence of an electromagnetic wave needs to be reduced. The computer or the like is requested to perform various kinds of processes at high speed. In order to perform the processes at high speed in the computer or the like, the frequency of a clock signal for adjusting the operating timing of elements or circuits respectively forming parts of the computer or the like. At present, the frequency of the clock signal is widely set to several MHz to several GHz.

However, it has been known that, when the frequency of the clock signal is raised, that is, when a high frequency is used for the clock signal, the generation of an electromagnetic shield noise, what is called an EMI (Electro Magnetic Interference) noise increases. The EMI noise has a problem that the EMI noise is amplified when a switching operation (for instance, 0 to 1 or 1 to 0) is performed at the same time synchronously with the clock signal, for instance, upon outputting the signal.

To reduce the EMI noise, a special interface standard such as an ECL or an SSTL has been hitherto used, cables of a transmission system or the like have been coated with shield members, or EMI filters have been provided in all signal lines to reduce a noise level.

However, in the above-described case, the special interface standard is used or the shield members or the EMI filters need to be added. Consequently, a cost is increased.

Further, even when the special interface standard is used or the shield members or the EMI filters are added as described above, the amplification of noise due to the simultaneous switching synchronous with the clock signal is hardly reduced.

On the other hand, an image reading apparatus which has an image pick-up unit such as a CCD (Charge Coupled Device) to form digital image data from an analog electric signal outputted from the image pick-up unit and output the digital image data has been known. From the image pick-up unit of the image reading apparatus, the analog electric signal is outputted as described above. The analog electric signal is outputted at a prescribed timing for each line. Therefore, the analog electric signal outputted from the image pick-up unit needs to be specified to a prescribed output timing. Not only the image reading apparatus, but also the computer or the peripheral devices thereof use the clock signal of a prescribed frequency to specify the input and output timing of data or a calculating timing. The data is inputted and outputted or calculated synchronously with the clock signal.

In this image reading apparatus, a control signal synchronous with the clock signal is used to specify the output timing of the analog electric signal from the image pick-up unit.

In a usual image reading apparatus, for instance, two control signals are supplied to image pick-up unit to specify the output timing of an analog electric signal in accord with a cross-point at which the two control signals intersect. That is, the analog electric signal is outputted from the image pick-up unit at the cross-point where the two control signals intersect.

To allow the image pick-up unit to recognize the cross-point, voltage at the cross-point needs to be located within a prescribed range.

However, the voltage at the cross-point is different for each type of the image pick-up unit, that is, every time the kind of the image pick-up unit or a substrate changes. Each type of image pick-up unit has specific voltage characteristic of each image pick-up unit. Therefore, the voltage at the cross-point of the control signals needs to be set to the specific voltage for each of the image pick-up unit. When the voltage at the cross-point is not the specific voltage, the analog electric signal is not outputted from the image pick-up unit. Accordingly, each image pick-up unit needs to be strictly adjusted so that the voltage at the cross-point becomes the specific voltage.

Thus, a resistance element or a capacitor element or the like has been hitherto disposed in a control signal circuit part for supplying a control signal to image pick-up unit. Thus, a resistance value or a capacity thereof has been adjusted to adjust the waveform of the control signal and voltage at a cross-point.

However, since the specific voltage is different for each image pick-up unit, the resistance value or the capacity of the resistance element or the capacitor element needs to be adjusted for each image pick-up unit. Therefore, after the image pick-up unit is disposed on, for instance, a substrate, an externally attached adjusting circuit including a resistance element or a capacitor element needs to be provided to adjust the waveform of a control signal in accordance with the specific voltage of the image pick-up unit. As a result, the adjustment of the voltage at the cross-point disadvantageously becomes complicated.

Accordingly, it is an object of the present invention to provide an image reading apparatus in which EMI noise is reduced and the amplification of noise due to a simultaneous switching operation is reduced without requiring the use of a special interface standard or the addition of a shield member.

Further, it is another object of the present invention to provide an image reading apparatus in which voltage at a cross-point is easily adjusted without requiring the adjustment of a waveform and an externally attached circuit.

DISCLOSURE OF THE INVENTION

An image reading apparatus according to the first invention has output timing changing unit in an output side of an output signal generating unit. The output timing changing unit changes the output timing of each digital output signal forming a plurality of digital output signals outputted from the output signal generating unit for each digital output signal. That is, the output timing of the digital output signal outputted from the output signal generating unit is changed for each of digital output signals corresponding to the number of output bits. Therefore, the waveform of the digital output signal is different for each digital output signal, so that the simultaneous switching can be prevented. Since the waveform of the digital output signal is different for each digital output signal, the current peaks of the outputted signals are dispersed to lower the peak of noise generated from cables of a transmission system. As a result, EMI noise is reduced to improve an S/N ratio. Accordingly, the EMI noise can be reduced without requiring the use of a special interface standard or the addition of shield members and the amplification of noise due to the simultaneous switching can be reduced.

Further, the output timing changing unit shifts the output timing in view of time for each digital output signal. Since a clock signal is essentially used to synchronize the operations of a computer such as the image reading apparatus or the like, the digital output signals specified by the clock signal are also desirably outputted synchronously with the clock signal. However, as described above, the digital output signals are switched at the same time synchronously with the clock signal to amplify the EMI noise. Thus, the output timing changing unit shifts the output timing so as not to avoid the synchronization of the clock signal with the digital output signal to prevent the simultaneous switching of the digital output signals. For instance, in the clock signal of a prescribed frequency, a reference clock signal is used so that a phase can be adjusted during one cycle of the clock signal. As described above, the output timing of the digital output signal is shifted so that the simultaneous switching of the digital output signals can be prevented and the amplification of the EMI noise can be prevented.

Further, delay circuit parts are respectively disposed in output wiring parts. The delay circuit parts respectively delay the output timings of the digital output signals in view of time. For instance, when the output signal generating unit is disposed on a substrate, the delay circuit parts are merely disposed on the substrate. Accordingly, the delay circuit parts are easily formed.

Further, the delay circuit parts are set so that an amount of delay of the output timing of the digital output signal is different for each of the delay circuit parts. Accordingly, the output timing of the digital output signal is shifted for each digital output signal so that the amplification of the EMI noise due to the simultaneous switching can be reduced and noise generated due to the dispersion of current peaks can be reduced.

Further, the output timing changing unit changes a frequency for each digital output signal. In other words, the output timing changing unit changes a length of one cycle of the digital output signal, that is, a wavelength. When the frequency of the digital output signal is changed, the output timing of the digital output signal is shifted for each digital output signal. As a result, the simultaneous switching of the digital output signals can be prevented and the EMI noise can be prevented from being amplified.

Further, the output timing changing unit includes a plurality of delay circuit parts respectively disposed in the output wiring parts and a selector for selecting an arbitrary delay circuit part from among the plural delay circuit parts. An amount of delay is set so as to be different for each of the delay circuit parts. Then, when the selector selects one delay circuit part, the amount of delay is different for each output wiring part. Therefore, the output timing of the digital output signal can be changed at random for each of the output wiring parts. Further, the output timing of the digital output signal is changed at random for each output wiring part, so that not only the output timing, but also the frequency can be changed. Therefore, the amplification of the EMI noise due to the simultaneous switching and the noise generated due to the dispersion of current peaks can be reduced.

An image reading apparatus according to the second invention includes cross-point adjusting unit. The cross-point adjusting unit respectively controls the amount of delay of a plurality of control signals in view of time for each of the control signals to adjust voltage at a cross-point by adjusting the amount of delay of each control signal. Since the cross-point adjusting unit is provided, an externally attached adjusting circuit does not need to be provided after image pick-up unit is provided. Accordingly, the amount of delay of the control signal can be adjusted for each image pick-up unit by the cross-point adjusting unit. The capacity of an element of an externally attached circuit does not need to be adjusted, and accordingly, specific voltage and the voltage at the cross-point are easily adjusted.

Further, the amount of delay of the plural control signals is adjusted for each control signal. That is, the voltage at the cross-point is adjusted by adjusting the amount of delay. Therefore, the deterioration of the control signal can be prevented and the incomplete operation of the image pick-up unit can be prevented.

Further, the image reading apparatus includes recording unit. The recording unit can record the amount of delay of a plurality of control signals corresponding to the specific voltage in view of time. Accordingly, when the amount of delay of the control signal is recorded in the recording unit, for instance upon shipment, the voltage at the cross-point can be adjusted at any time on the basis of the recorded amount of delay.

Further, the cross-point adjusting unit includes a plurality of delay circuit parts and a selector. The delay circuit parts respectively change an amount of delay in view of time for each control signal of the plural control signals supplied to the image pick-up unit. The plural delay circuit parts are provided to finely set the amount of delay for each control signal. The selector selects a specific delay circuit part with an amount of delay suitable for adjusting the voltage at the cross point from among the plural delay circuit parts. Thus, the amount of delay of the control signal can be finely controlled and the voltage at the cross-point can be precisely controlled.

Further, the selector selects the specific delay circuit part on the basis of the amount of delay recorded on the recording unit. Accordingly, the cross-point adjusting unit can always control the voltage at the cross-point to a prescribed value.

BRIEF DESCRIPTION OF THE DRAWINGS

FIG. 8 is a schematic view showing a timing chart of the image reading apparatus according to the second embodiment of the present invention.

BEST MODE FOR CARRYING OUT THE INVENTION

Figure 1:
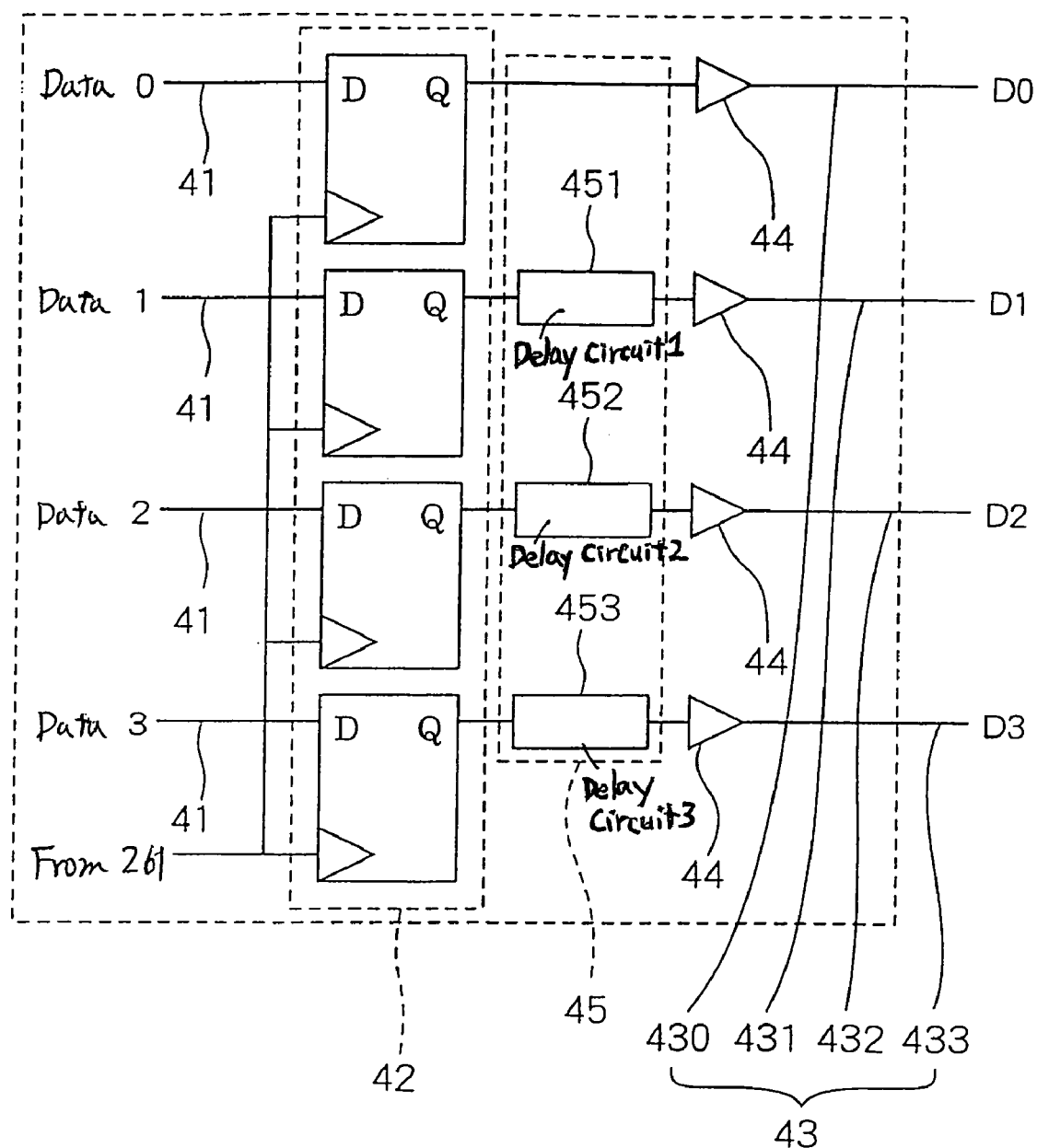
FIG. 1 is a schematic view showing a signal output part of an image reading apparatus according to a first embodiment of the present invention.

Now, a plurality of embodiments showing modes for carrying out the present invention will be described in detail by referring to the drawings.

First Embodiment

Figure 2:
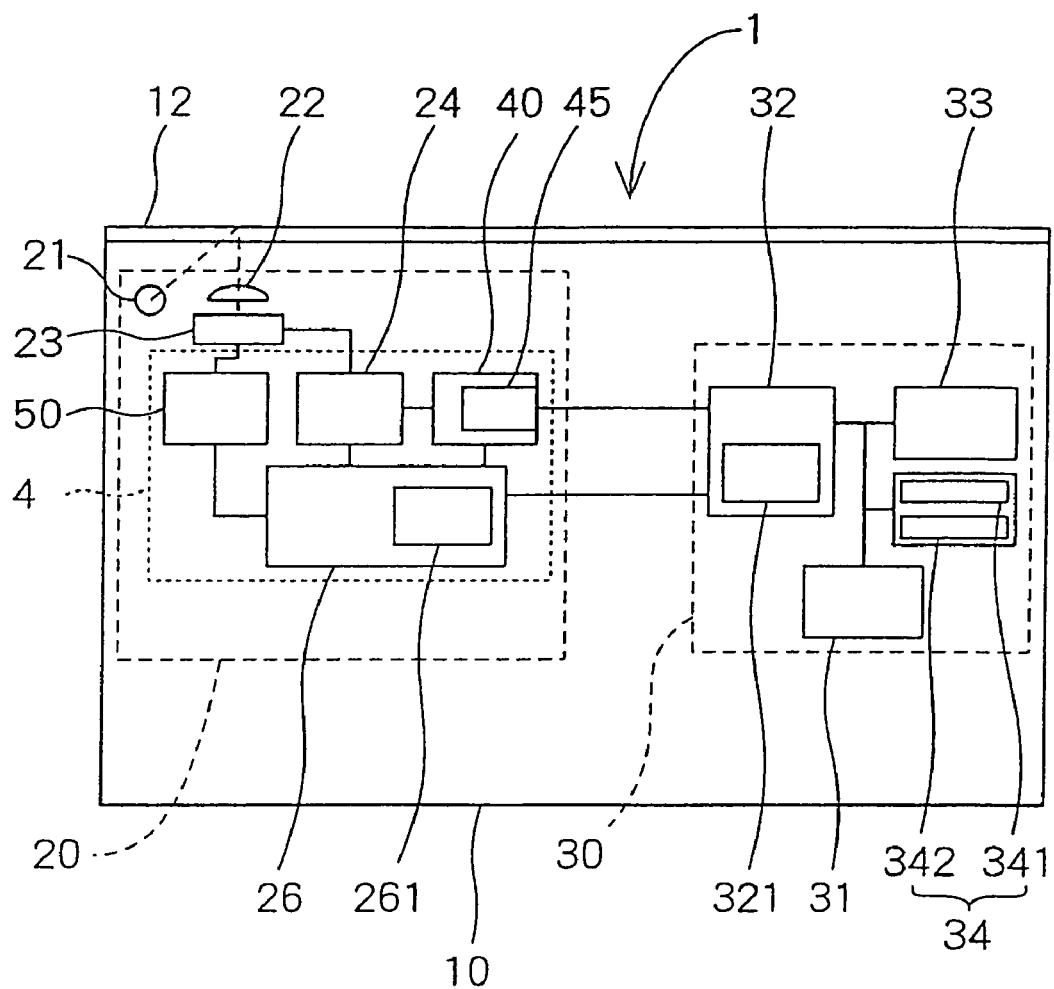
FIG. 2 is a block diagram showing the image reading apparatus according to the first embodiment of the present invention.

An image reading apparatus according to a first embodiment is shown in FIG. 2. The image reading apparatus according to the first embodiment is a flat bed type image reading apparatus.

As shown in FIG. 2, the image reading apparatus 1 includes a carriage 20 and a main control part 30 in a box shaped main body 10. A data holder 11 is arranged on an upper part of the main body 10. A copy to be read is mounted on the part of the data holder 11 opposite to the carriage side. The carriage 20 disposed in the main body 10 can reciprocate in a sub-scanning direction in parallel with the data holder 11 by a driving device not shown in the drawing.

On the carriage 20, a light source 21, a converging lens 22, a line sensor 23 as image pick-up unit, an A/D converting part 24, a signal output part 40 as output signal generating unit and a carriage control part 26 are mounted.

The converging lens 22 converges light from data on the line sensor 23. As the line sensor 23, a charge storage type optical sensor such as a CCD in which a plurality of pixels are linearly arranged in a main scanning direction perpendicular to the moving direction of the carriage 20 is employed.

The light source 21 is provided perpendicularly to the moving direction of the carriage 20. A fluorescent lamp or the like is used. Light applied from the light source 21 is reflected on the surface of a reflecting copy such as a sheet and incident on the line sensor 23.

The A/D converting part 24 converts an analog electric signal outputted from the line sensor 23 to a digital electric signal. The signal output part 40 generates and outputs a plurality of digital output signals corresponding to the number of bits from the digital electric signal outputted from the A/D converting part 24. In the output side of the signal output part 40, output timing changing unit 45 is provided.

The carriage control part 26 controls respective components of the carriage 20 in accordance with an instruction from the main control part 30. In the carriage control part 26, a clock generating part 261 is provided as clock signal supply unit.

The main control part 30 includes a microcomputer 31, an image processing ASIC (Application Specific IC) 32 and an interface 33. The microcomputer 31 includes a CPU (Central Processing Unit), a RAM (Random Access Memory) and a ROM (Read Only Memory) or the like which are not shown in the drawing to control the respective parts of the image reading apparatus 1 via the image processing ASIC 32.

The image processing ASIC 32 includes a clock generating circuit 321, and a shading correction part, a gamma correction part and other correction parts that are not shown in the drawing. The clock generating circuit 321 supplies a basic clock signal to each part of the image reading apparatus 1. The image processing ASIC 32 carries out various kinds of processes to the digital output signal outputted from the signal output part 40 of the carriage 20 to form digital image data.

The shading correction part carries out a shading correction to the digital output signal outputted from the signal output part 40. For example, unevenness in the sensitivity for each pixel of the line sensor 23 and unevenness in the quantity of light of the light source 21 in the main scanning direction are corrected by using data obtained by reading a white reference before a reading operation is started. The gamma correction part carries out a gamma correction by a prescribed gamma function to convert a shading corrected digital output signal to digital image data. Other correction part carries out various conversions such as a color correction, an edge emphasis and enlargement/reduction of area, etc.

The digital image data prepared in the image processing ASIC 321 is outputted to an image processor such as a personal computer connected to an external part from the interface 33.

In the clock generating circuit 321, the basic clock signal of a low frequency is generated. The generated basic clock signal is supplied to the clock generating part 261 of the carriage control part 26. In the clock generating part 261, the basic clock signal of the low frequency generated in the clock generating circuit 321 is sequentially multiplied to generate a control clock signal. The control clock signal generated in the clock generating part 261 is supplied to the line sensor 23, the A/D converting part 24 and the signal output part 40.

From the clock generating circuit 321 of the main control part 30, the basic clock signal of the low frequency, for instance, about 6 Hz is supplied. The basic clock signal supplied to the carriage control part 26 is multiplied by 16 in the clock generating part 261 and supplied to the line sensor 23, the A/D converting part 24 and the signal output part 40 as the control clock signal of 96 MHz. The line sensor 23, the A/D converting part 24 and the signal output part 40 operate synchronously with the supplied control clock signal.

An electric charge stored synchronously with the control clock signal is outputted as an analog electric signal from the line sensor 23. In the A/D converting part 24, a digital electric signal is generated from the analog electric signal. The generated digital electric signal is outputted as a digital output signal synchronously with the control clock signal from the signal output part 40.

The clock generating part 261 of the carriage control part 26 sequentially multiplies the basic clock signal of the low frequency generated in the clock generating circuit 321 as clock signal generating unit disposed in the main control part 30 to form an operating clock signal of a high frequency. The operating clock signal generated in the clock generating part 261 is supplied to the line sensor 23, the A/D converting part 24, the signal output part 40 and a cross-point adjusting part 50.

The cross-point adjusting part 50 generates a control signal from the operating clock signal generated in the clock generating part 261 of the carriage control part 26. The cross-point adjusting part 50 adjusts the amount of delay of the control signal and the cross-point of the control signal in accordance with an instruction from the main control part 30.

Now, the signal output part will be described in detail.

The signal output part 40 generates the digital output signals corresponding to the number of output bits from the digital electric signal outputted from the A/D converting part 24. In this embodiment, a case in which the number of output bits is 4 bits is described.

As shown in FIG. 1, the signal output part 40 has data wiring parts 41, a signal converting part 42 and an output wiring part 43. The data wiring parts 41 are electric wiring for connecting the A/D converting part 24 to the signal converting part 42. The signal converting part 42 converts the digital electric signal inputted from the data wiring parts 41 to the digital output signals corresponding to the number of output bits. The output wiring part 43 is electric wiring for outputting the digital output signals converted in the signal converting part 42.

The data wiring parts 41, the signal converting part 42 and the output wiring part 43 are formed on a single substrate or a single chip to constitute a signal output ASIC.

The output wiring part 43 has four wiring 430, 431, 432 and 433 corresponding to the four bits as the number of output bits. Output buffers 44 are respectively provided in the four wiring 430 to 433. The output buffers 44 improve the driving performance of the output signals. Between the signal converting part 42 and the output buffers 44, an output timing changing unit 45 for changing the output timing of the output signal is provided. The output timing changing unit 45 includes delay circuit parts 451, 452 and 453 disposed respectively in the output wiring part 43 between the signal converting part 42 and the output buffers 44. The delay circuit parts 451 to 453 are composed of delay elements, for instance, capacitors. The capacities of the delay elements are different respectively for the delay circuit parts.

The control clock signal is supplied to the signal converting part 42 from the clock generating part 261. From the signal converting part 42, the digital output signals corresponding to the number of output bits are outputted synchronously with the control clock signal. For instance, when an output has 2 bits, a signal D0 and a signal D1 outputted from the wiring 430 and the wiring 431 of the output wiring part 43 are "1", and a signal D2 and a signal D3 outputted from the wiring 432 and the wiring 433 are "0". The digital output signals from the signal converting part 42 are outputted to the image processing ASIC 32 of the main control part 30 via the output wiring part 43.

Now, an operation of the signal output part 40 will be described below.

Figure 3:
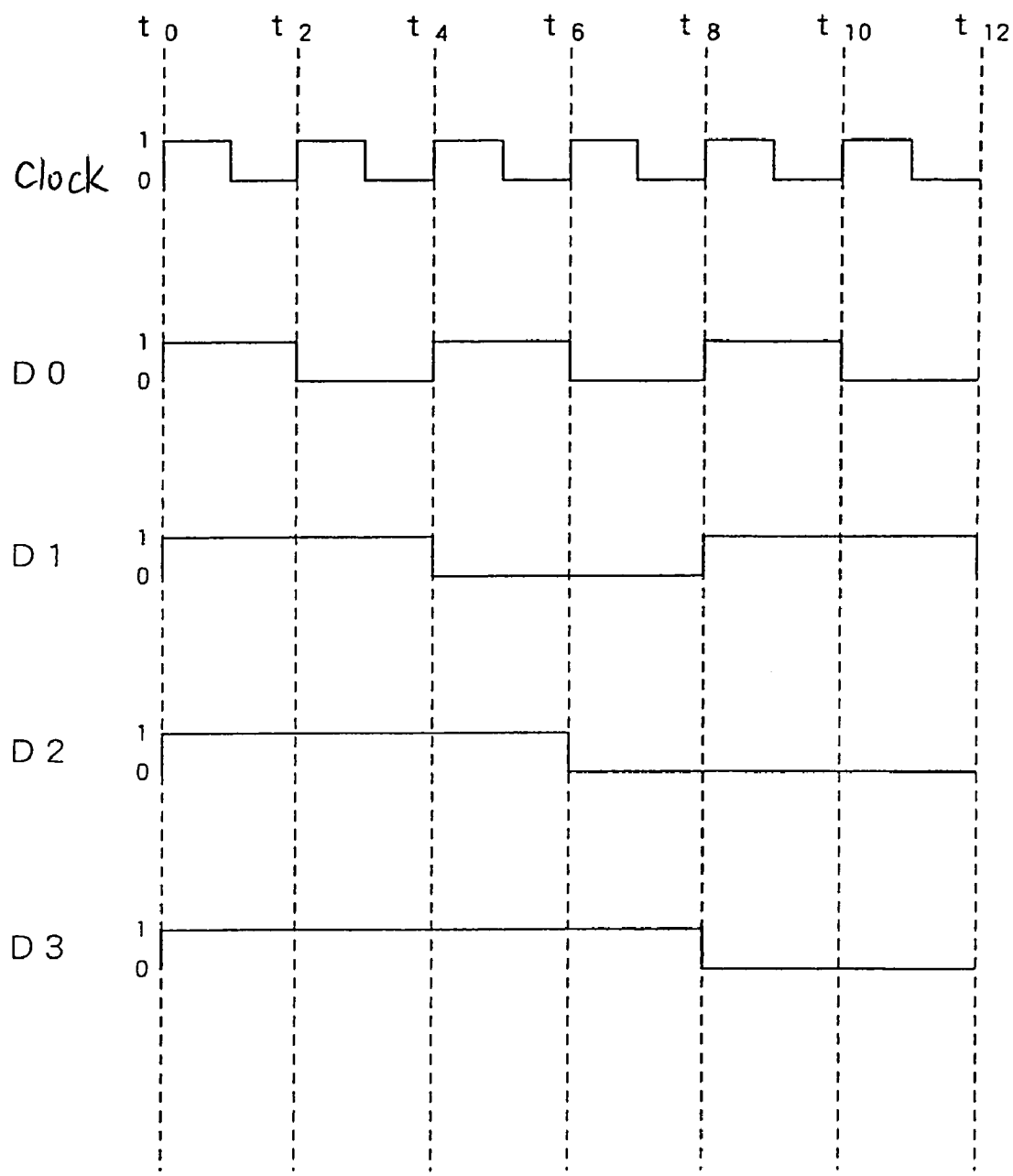
FIG. 3 is a schematic view showing a timing chart of a case in which output timing changing unit is not provided for comparison.

As described above, the digital output signals are outputted synchronously with the control clock signal from the signal converting part 42. Therefore, for instance, when the output timing changing unit 45 is not provided, the signals D0 to D3 outputted via the output wiring part 43 are switched synchronously with the control clock signal as shown in FIG. 3. That is, as shown in FIG. 3, the signals simultaneously change from 0 to 1 or from 1 to 0 in an output timing tn (n is an arbitrary integer). Accordingly, as shown in a timing t0, all the signals may be switched from "0" to "1" synchronously with the control clock signal. When a plurality of signals are switched in the same manner synchronously with the control clock signal as described above, EMI noise is amplified.

Figure 4:
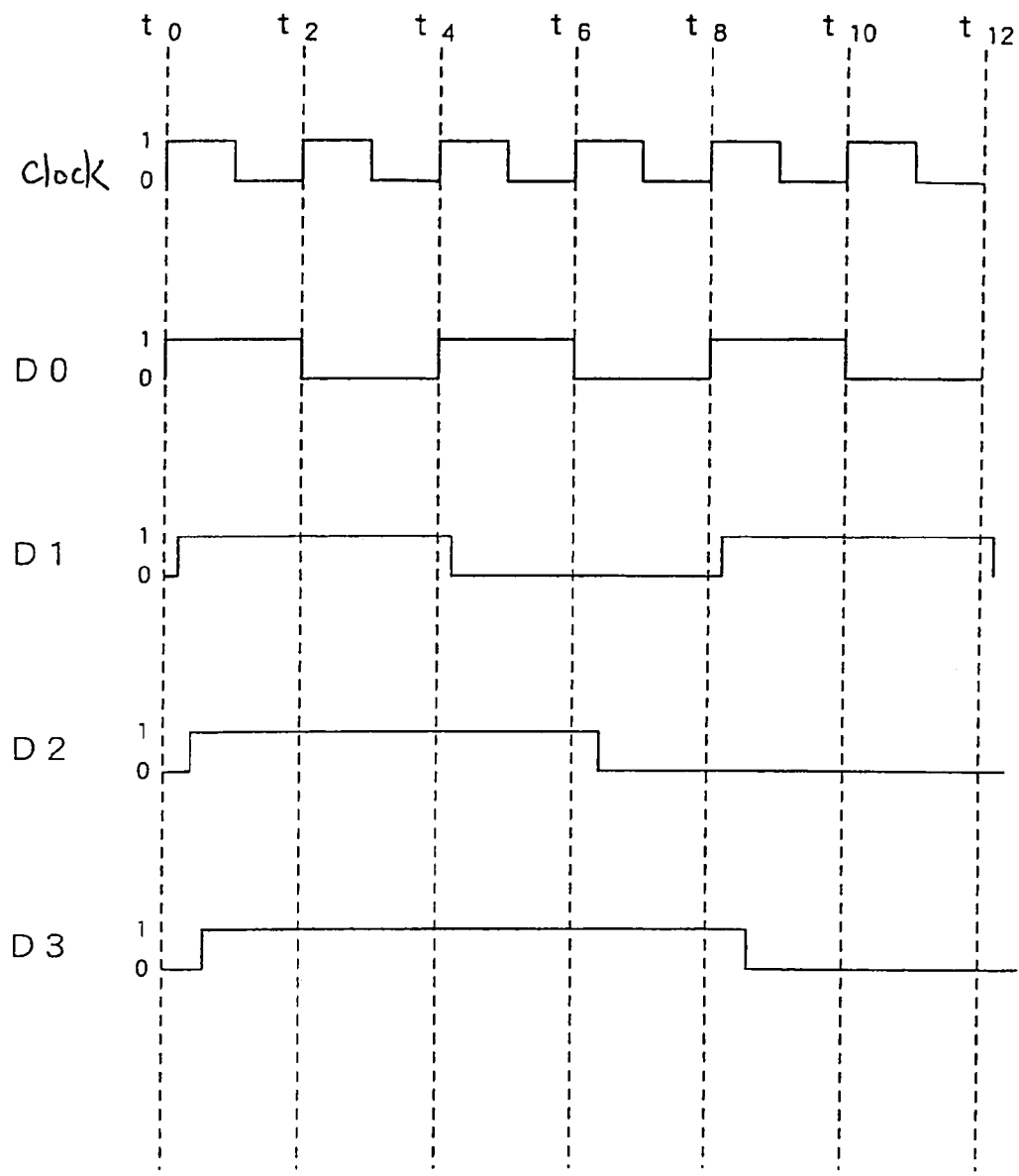
FIG. 4 is a schematic view showing a timing chart of the image reading apparatus according to the first embodiment of the present invention.

In this embodiment, the output timing changing unit 45 is provided between the signal converting part 42 and the output buffers 44. Thus, the output signals outputted from the signal converting part 42 have time lag respectively generated in switching in the signals D0 to D3 outputted from the wiring 430 to 433 depending on the capacities of the delay elements of the delay circuit parts 451 to 453. As shown in FIG. 1, when the delay element is not provided in the wiring 430 and the capacities of the delay elements are increased in order in the wiring 431, 432 and 433, signals D0 to D4 outputted from the signal converting part 42 have respectively time lag generated as shown in FIG. 4.

Therefore, even when the signals D0 to D4 are outputted synchronously with the clock signal, the switching from "0" to "1" or the switching from "1" to "0" is not generated at the same time. As a result, the amplification of the EMI noise is reduced.

The signals D0 to D4 having the time lag generated by the output timing changing unit 45 are inputted to the image processing ASIC 32 and then the time lag is adjusted synchronously with the basic clock signal outputted from the clock generating circuit 321.

Now, the cross-point adjusting part 50 will be described in detail.

Figure 5:
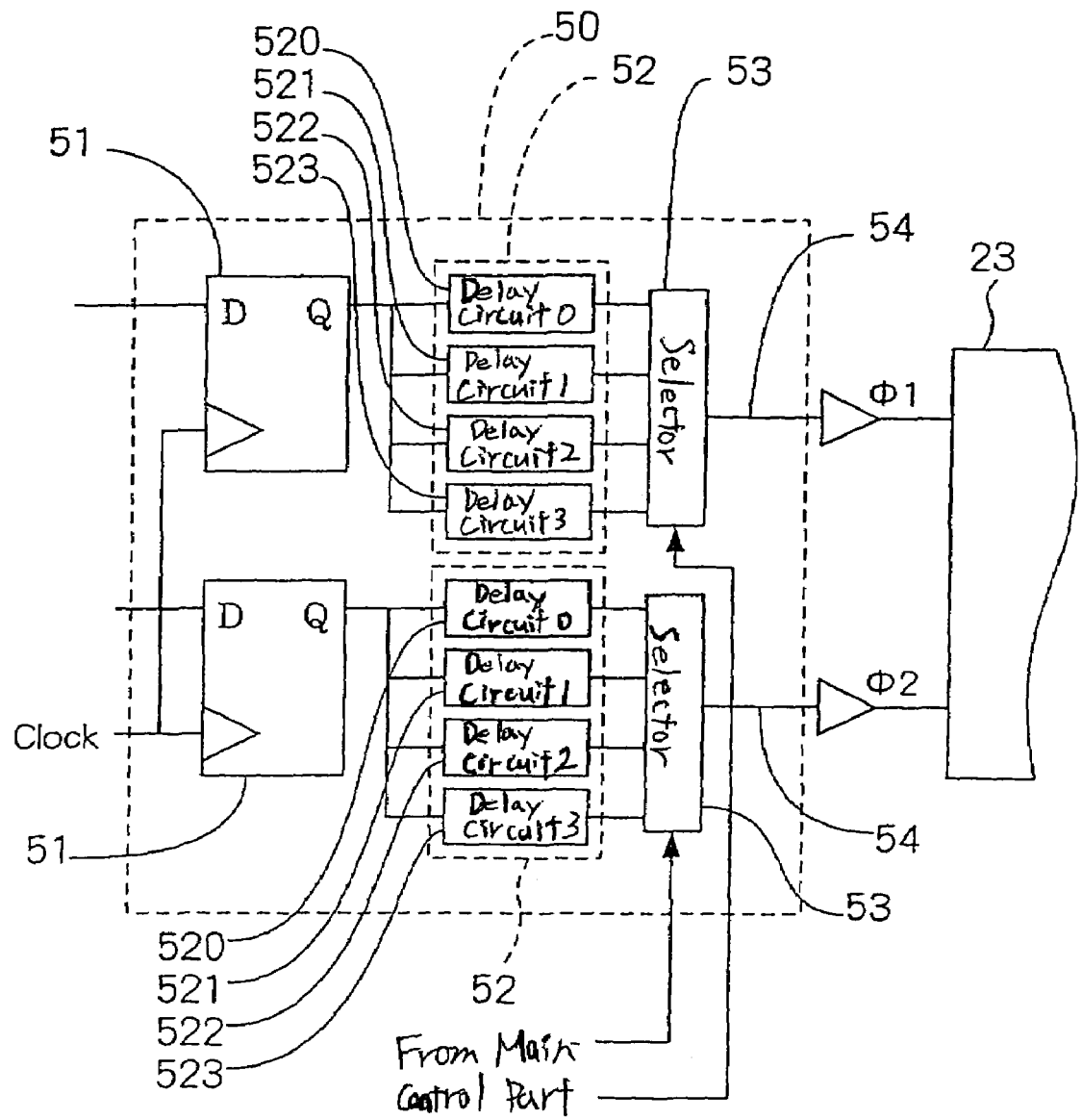
FIG. 5 is a schematic view showing a cross-point adjusting part of the image reading apparatus according to the first embodiment of the present invention.

The cross-point adjusting part 50 is connected to the line sensor 23 as shown in FIG. 5. The cross-point adjusting part 50 includes control signal generating parts 51 for generating control signals, delay circuit parts 52, selectors 53 and control signal supply wiring parts 54. In the control signal generating part 51, the control signal is generated synchronously with the operating clock signal supplied from the clock generating part 261. In this embodiment, two control signals are generated synchronously with the operating clock signal.

The delay circuit parts 52 are respectively provided in the line sensor 23 side of the control signal generating parts 51 to change the amounts of delay of the control signals outputted from the control signal generating parts 51. Each delay circuit part 52 includes four delay circuits 520, 521, 522 and 523 having delay elements respectively having different amounts of delay. The amount of delay means a time lag of the control signals and its unit is "sec". As the delay element, for instance, a capacitor element or a resistance element is used. In this embodiment, the amount of delay of the delay circuit 520 is set to 0 nsec. The amount of delay of the delay circuit 521 is set to 1 nsec. The amount of the delay circuit 522 is set to 3 nsec and the amount of delay of the delay circuit 523 is set to 8 nsec. These amounts of delay are combined together so that the time lags of 0, 1, 2, 3, 5, 7 and 8 nsecs can be set to the control signals outputted from the two control signal generating parts 51. The selectors 53 are provided in the line sensor 23 side of the delay circuit parts 52 to select specific delay circuits from the delay circuits 520 to 523 forming the delay circuit parts 52 in accordance with an instruction of the microcomputer 31 of the main control part 30. When the selectors 53 select the specific delay circuits, any of the above-described amounts of delay is set. The control signal supply wiring parts 54 supply the control signals generated in the control signal generating parts 51 to the line sensor 23.

Now, an operation of the cross-point adjusting part 50 will be described below.

Figure 6:
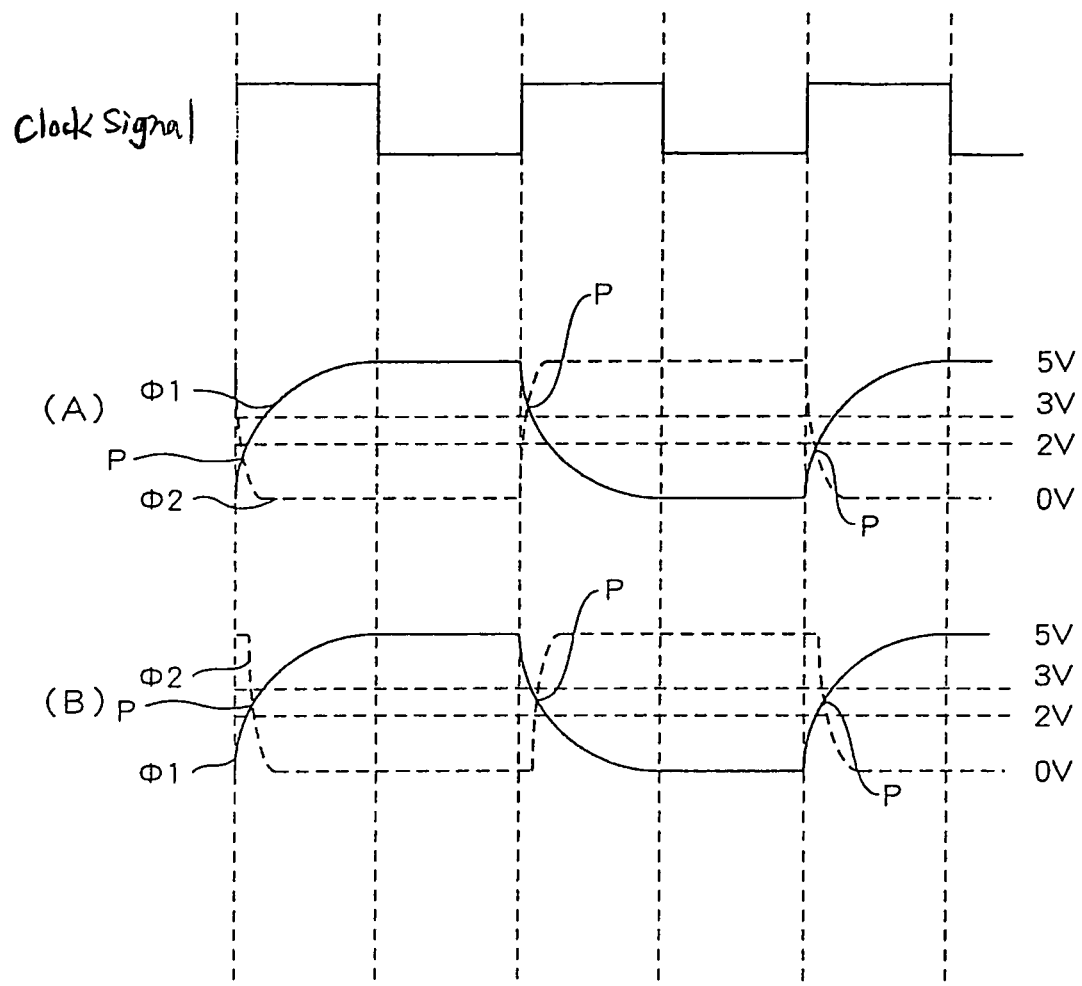
FIG. 6 is a schematic view showing a timing chart of a control signal outputted from the cross-point adjusting part of the image reading apparatus according to the first embodiment of the present invention.

The output timing of the analog electric signal outputted from the line sensor 23 is controlled by the control signals. That is, as shown in FIG. 6, a cross-point P at which the control signals Φ1 and Φ2 outputted from the two control signal generating parts 51 cross is specified as the output timing of the analog electric signal from the line sensor 23. In other words, the analog electric signal is outputted from the line sensor 23 every time the two control signals Φ1 and Φ2 cross.

The line sensor 23 is set so that the line sensor outputs the analog electric signal when voltage in the intersection of these control signals Φ1 and Φ2 is located within a prescribed range of, for instance, 2.0 V to 3.0 V. The voltage of the cross-point P and the range of the voltage are different respectively for various types of line sensors 23 by setting in design and determined as specific cross-points respectively for the line sensors 23. Accordingly, the amounts of delay of the control signals Φ1 and Φ2 need to be adjusted so that the voltage at the cross-point P is located within a range determined for each of the line sensors 23.

As shown in FIG. 6, when the specific voltage is set to 2.0 V to 3.0 V, the voltage of the cross-point P is not located within the range of the specific voltage depending on the waveforms of the control signals Φ1 and Φ2 as shown in FIG. 6(A). The deformation of the waveforms of the control signals Φ1 and Φ2 is generated from various kinds of factors such as the capacities of pixels forming the line sensor 23 or the difference of electric resistance for each wiring of the control signal supply wiring parts 54 connected to the line sensor 23.

Thus, in this embodiment, as shown in FIG. 6(B), a time lag is generated in the control signal Φ2, that is, the control signal Φ2 is delayed to adjust the voltage at the cross-point P to 2.0 V to 3.0 V as the specific voltage.

The amounts of delay of the control signals Φ1 and Φ2 are set for each type of line sensors 23 and previously recorded in the ROM 342 of a recording part 34. Upon using the image reading apparatus 1, the microcomputer 31 controls the selectors 53 on the basis of the amounts of delay recorded in the ROM 342 to select the delay circuits so as to have prescribed amounts of delay. Therefore, in the two control signals Φ1 and Φ2 outputted from the control signal generating parts 51, the voltage in the cross-point P is adjusted to the specific voltage of the line sensor 23. The amounts of delay are controlled for each of output timings of the control signals.

For instance, in producing the image reading apparatus 1, when a carriage base 4 is previously produced, and then, the line sensor 23 is mounted on the carriage base 4, the amounts of delay of the control signals Φ1 and Φ2 are determined so as to correspond to the specific voltage different for each of the line sensors 23 and the amounts of delay are stored in the ROM 342. Then, the microcomputer 31 controls the selectors 53 on the basis of the amounts of delay stored in the ROM 342 to control the amounts of delay of the control signals Φ1 and Φ2.

Now, an operation of the above-described image reading apparatus 1 will be described below.

A user mounts data desired to be read on the data holder 11 and instructs the image reading apparatus 1 to start to read the data via a driver program for controlling the image reading apparatus 1 such as a TWAIN activated by a personal computer.

When the user instructs to start to read the data, the microcomputer 31 turns on the light source 21. Then, the carriage 20 is moved in the sub-scanning direction at prescribed speed in accordance with the instruction of the microcomputer 31. Light reflected on the data is made incident on the line sensor 23. The incident light is converted into an electric charge and the electric charge is stored. The stored electric charge is transferred to a shift register (not shown) of the line sensor 23 synchronously with the control clock signal and the analog electric signal of one line is outputted from the line sensor 23. The analog electric signal outputted from the line sensor 23 is outputted to the image processing ASIC 32 via the A/D converting part 24 and the signal output part 40. The digital image data prepared in the image processing ASIC 32 is outputted to the personal computer via the interface 33.

While the carriage 20 is moved in the sub-scanning direction at prescribed speed, the above-described processes are repeated to read the data.

As described above, in the image reading apparatus 1 according to the first embodiment of the present invention, the digital output signals outputted from the signal converting part 42 of the signal output part 40 are outputted with time lag by the delay circuit parts 451 to 453 of the output timing changing unit 45. Accordingly, the EMI noise due to the simultaneous switching can be reduced.

Further, in the first embodiment, the delay circuit parts 451 to 453 are disposed on a substrate on which the signal converting part 42 is formed near the output wiring part 43 of the signal converting part 42 or on the same substrate as the chip or on the chip. Therefore, the delay circuit parts 451 to 453 can be disposed simultaneously with the formation of the signal converting part 42, so that manufacturing steps are not increased or a wiring structure is not complicated. Further, since the special interface or the shield members or the like for shielding the EMI noise are not necessary, the manufacture cost is not increased.

Further, in the image reading apparatus 1 according to the first embodiment of the present invention, a plurality delay circuits 520 to 523 are provided in the cross-point adjusting part 50. Then, the specific delay circuits are selected from these plural delay circuits 520 to 523 so that the amounts of delay of the control signals Φ1 and Φ2 can be accurately adjusted. Accordingly, voltage at the cross-point P can be easily adjusted within a range of the specific voltage. As a result, even when the specific voltage of the line sensor 23 is different for each image reading apparatus 1, an external circuit for adjusting the voltage at the cross-point P is not required and the voltage at the cross-point P can be easily and accurately adjusted.

Further, the amounts of delay are recorded in the ROM 342 of the recording part 34. Thus, the amounts of delay are set, for instance, upon shipment, so that the amounts of delay of the control signals Φ1 and Φ2 can be adjusted at any time during the use of the image reading apparatus 1.

Second Embodiment

Figure 7:
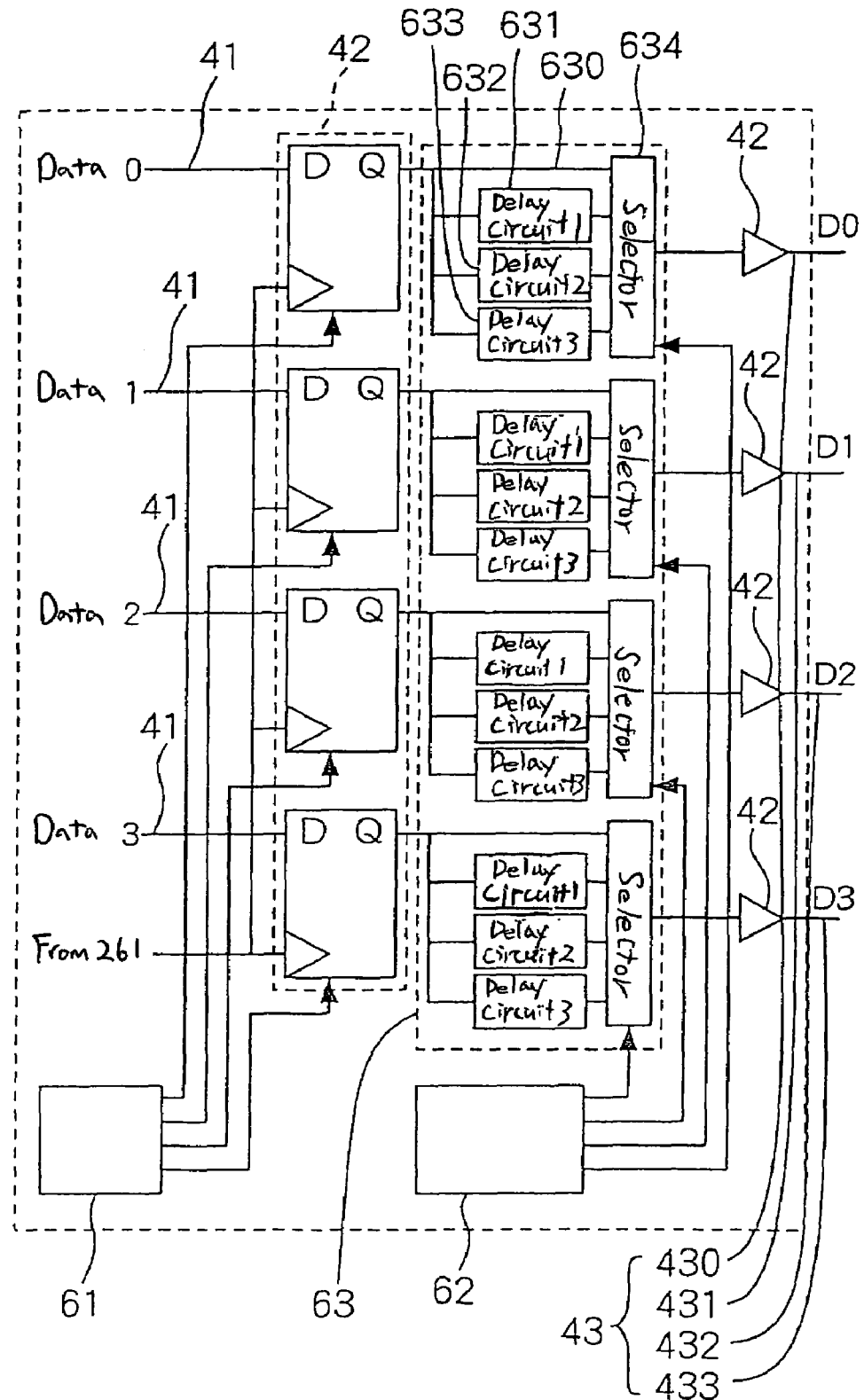
FIG. 7 is a schematic view showing a signal output part of an image reading apparatus according to a second embodiment of the present invention.

A second embodiment of the present invention is shown in FIG. 7. Components substantially the same as those of the first embodiment are designated by the same reference numerals and the explanation thereof will be omitted.

In the second embodiment, the structure of an output timing changing unit is different from that of the first embodiment. In the second embodiment, the output timing changing unit includes a random enable signal output part 61 and a select signal output part 62.

The random enable signal output part 61 generates a signal for changing the output timing itself of a digital output signal outputted from a signal converting part 42 and outputs the signal to the signal converting part 42.

In the signal converting part 42, a delay circuit part 63 is provided. The delay circuit part 63 is respectively connected to the signal converting part 42. The delay circuit part 63 includes a plurality of delay circuits 630 to 633 respectively connected to the signal converting part 42. The amounts of delay of circuits respectively forming the delay circuits 630 to 633 are different. For example, the amount of delay of the delay circuit 630 is 0. The amount of delay of the delay circuit 630 is respectively different from those of the delay circuit 631, the delay circuit 632 and the delay circuit 633. In the output side of the delay circuits 630 to 633, selectors 634 are disposed. The selectors 634 are connected to the select signal output part 62. The select signal output part 62 outputs a select signal to each selector 634. Then, the selector 634 selects any of the delay circuits 630 to 633 for each of output timings of the digital output signals outputted from the signal converting part 42 on the basis of the outputted select signal. That is, since the delay circuit selected for each output signal of the digital output signal is different depending on the select signal outputted from the select signal output part 62, the output timings of the digital output signals outputted from the signal converting part 42 are changed by a prescribed amount.

In a random enable signal or the select signal respectively outputted from the random enable signal output part 61 and the select signal output part 62, a change point of the digital output signal is changed for each clock in a specific area by using a clock signal of a cycle faster than that of the clock signal generated in the clock generating circuit 321, for instance, a clock signal of 16 times as shown in FIG. 8. That is, the change point of the digital output signal is changed by using the control clock signal having a cycle faster than that of a basic clock signal in which data is sampled in the image processing ASIC 32.

Now, an operation of the output timing changing unit according to the second embodiment will be described below.

As described above, the output timing of the digital output signal outputted from the signal converting part 42 synchronously with the control clock signal changes depending on the output timing itself of the signal converting part 42 and the amounts of delay of the delay circuit part 63 connected to the signal converting part 42. Specifically, the output timing of the digital output signal outputted from the signal converting part 42 changes in accordance with the random enable signal outputted from the random enable signal output part 61. Further, since the selector 634 selects any of the delay circuits 630 to 633 by the select signal outputted from the select signal output part 62, the output timing of and the mount of delay of the digital output signal finely change for each clock signal. The random enable signal and the select signal are outputted from the random enable signal output part 61 or the select signal output part 62 synchronously with the control clock signal.

As described above, the output timing and the amount of delay of the digital output signal are changed, so that the output timing of the digital output signal changes at random as shown in FIG. 8. Usually, as shown in FIG. 8, digital output signals have been respectively outputted at the same time from the signal converting parts 42 synchronously with the basic clock and the control clock. As compared therewith, in this embodiment, the output timing can be changed.

Frequency changed by the output timing changing unit is inputted to the image processing ASIC 32, and then, the frequency is corrected synchronously with the basic clock signal outputted from the clock generating circuit 321 and adjusted to a prescribed frequency.

In the second embodiment, the output timing of the digital output signal is changed at random to convert the output timing itself and the frequency of the digital output signal. Therefore, the simultaneous switching can be more effectively prevented and the amplification of the EMI noise can be reduced.

Further, in the second embodiment, the output timings of the digital output signals that are outputted from the signal converting part 42 and the amounts of delay of the outputted digital output signals are changed. Therefore, even when the output timing of the digital output signal from one signal converting part accidentally overlaps the output timing from another signal converting part by the random enable signal, the amount of delay by the delay circuit is changed for each of the output timings of the digital output signals. Thus, the change points of the digital output signals do not coincide. Accordingly, the generation and amplification of the EMI due to the simultaneous switching of the digital output signals can be more effectively prevented or reduced.

In the above plural embodiments, examples that the present invention is applied to the flat bed type image reading apparatus are described. However, the present invention is not limited to the flat bed type.

The invention claimed is:

1. An image reading apparatus comprising:
   an image pick-up unit which converts inputted light to an analog electric signal and outputs the analog electric signal;
   an A/D converting part which converts the analog electric signal outputted from the image pick-up unit to a digital electric signal;
   an output signal generating unit disposed in an output side of the A/D converting part including a signal converting part, which generates a plurality of digital output signals corresponding to the number of output bits on the basis of the digital electric signal and outputs the digital output signals;
   a plurality of output wiring parts provided in the output signal generating unit correspondingly to the number of the output bits;
   a plurality of delay circuit parts respectively disposed in the output wiring parts and delaying the output timing of the digital output signals;
   a selector for selecting one of the delay circuit parts;
   a clock signal supply unit which supplies clock signals for specifying output timing of the digital output signals; and
   an output timing changing unit disposed in an output side of the output signal generating unit, which changes the output timing for each of the digital output signals, wherein
   the output timing changing unit includes: a random enable signal output part which changes, at random, a change point of the digital output signal outputted from the signal converting part by using a control clock signal having a cycle faster than that of the clock signal supplied by the clock signal supply unit; and a select signal output part which outputs a select signal which indicates, at random, the delay circuit part selected by the selector by using a control clock signal having a cycle faster than that of the clock signal supplied by the clock signal supply unit.

2. The image reading apparatus according to claim 1, wherein the output timing changing unit shifts the output timing in view of time for each of the digital output signals.

3. The image reading apparatus according to claim 2, wherein the output timing changing unit includes delay circuit parts provided in the output wiring parts, respectively, each of which delays the output timing in view of time for each of the digital output signals.

4. The image reading apparatus according to claim 3, wherein the delay circuit part is set so that an amount of delay in time of each of the digital output signals is different for each delay circuit part.

5. The image reading apparatus according to claim 1, wherein the output timing changing unit changes a frequency for each of the digital output signals so as to shift the output timing for each of the digital output signals.

6. An image reading apparatus comprising:
   an image pick-up unit which converts inputted light to an analog electric signal and outputs the analog electric signal,
   a clock signal generating unit which generates a clock signal for controlling an operating timing of the image pick-up unit;
   a control signal generating unit which generates a plurality of control signals for controlling the output timing of the electric signal synchronously with the clock signal; and
   a cross-point adjusting unit which adjusts an amount of time delay for each of the control signals and adjusts voltages at cross-points of the control signals to specific voltage characteristic of the image pick-up unit.

7. The image reading apparatus according to claim 6, further comprising a recording unit capable of recording the amount of time delay for each of the control signals.

8. The image reading apparatus according to claim 6, wherein the cross-point adjusting unit includes a plurality of delay circuit parts for varying the amount of delay for each of the control signals and a selector for selecting a specific delay circuit part from among the delay circuit parts.

9. The image reading apparatus according to claim 8, wherein the selector selects the specific delay circuit part on the basis of the amount of time delay recorded in the recording unit.

\* \* \* \* \*